(12) United States Patent  
Kerr

(10) Patent No.: US 6,446,776 B1  
(45) Date of Patent: Sep. 10, 2002

(54) SPIRAL-TYPE COUPLING

(75) Inventor: John Hugh Kerr, Kingston (CA)

(73) Assignee: Ker-Train Holdings LTD, Kingston (CA)

( * ) Notice: Subject to any disclaimer, the term of this patent is extended or adjusted under 35 U.S.C. 154(b) by 0 days.

(21) Appl. No.: 09/554,329

(22) PCT Filed: Nov. 26, 1998

(86) PCT No.: PCT/CA98/01071

§ 371 (c)(1),  
(2), (4) Date: Jul. 17, 2000

(87) PCT Pub. No.: WO99/28644

PCT Pub. Date: Jun. 10, 1999

Related U.S. Application Data

(60) Provisional application No. 60/066,666, filed on Nov. 26, 1997.

(51) Int. Cl.[7] ................................................. F16D 41/08  
(52) U.S. Cl. ......................................................... 192/44  
(58) Field of Search ................................ 192/41 R, 43, 192/44, 45, 45.1

(56) References Cited

U.S. PATENT DOCUMENTS

| | | | | | |
|---|---|---|---|---|---|
| 4,341,294 | A | * | 7/1982 | Kerr | 192/45 |
| 5,638,929 | A | * | 6/1997 | Park | 192/44 |
| 5,638,931 | A | * | 6/1997 | Kerr | 192/45 |
| 6,129,189 | A | * | 10/2000 | Kerr | 192/45 |

* cited by examiner

*Primary Examiner*—Charles A Marmor  
*Assistant Examiner*—Saúl Rodriguez  
(74) *Attorney, Agent, or Firm*—Clark Hill PLC

(57) ABSTRACT

A spiral type coupling (10) consists of a tubular slipper (14) between a tubular member (12) and a race (6), there being engageable tubular friction surfaces (20, 36) on the slipper (14) and the race (16), and facing pairs of clockwise and counterclockwise spiral surfaces (18a, 18b, 22a, 22b) on the tubular member (12) and the slipper (14) defining therebetween a channel (28) receiving roller members (30), there being an actuator engageable with the slipper (14) to provide two, three or four different modes of operation (e.g., lock up, freewheel in both directions, freewheel in one direction and/or the other).

17 Claims, 7 Drawing Sheets

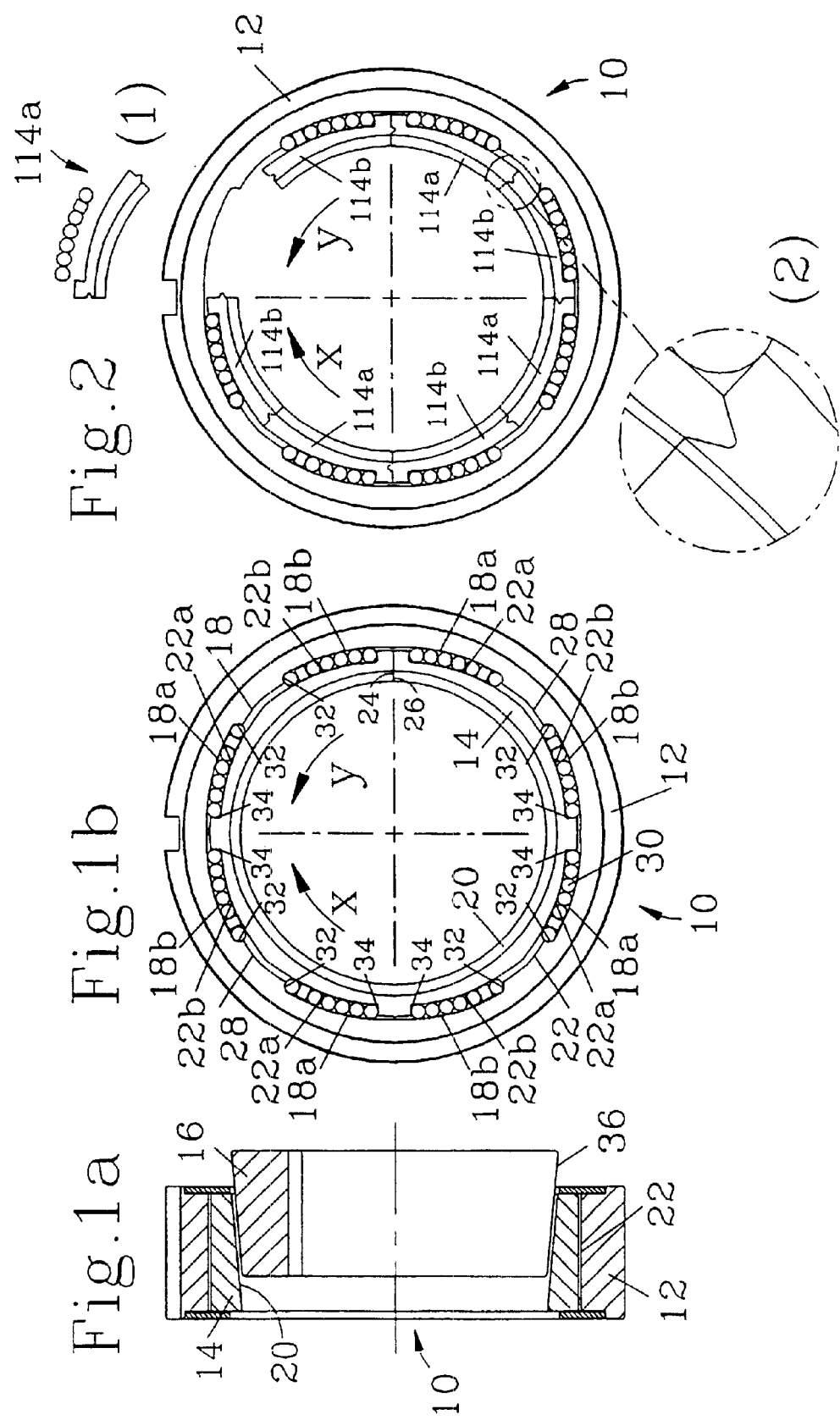

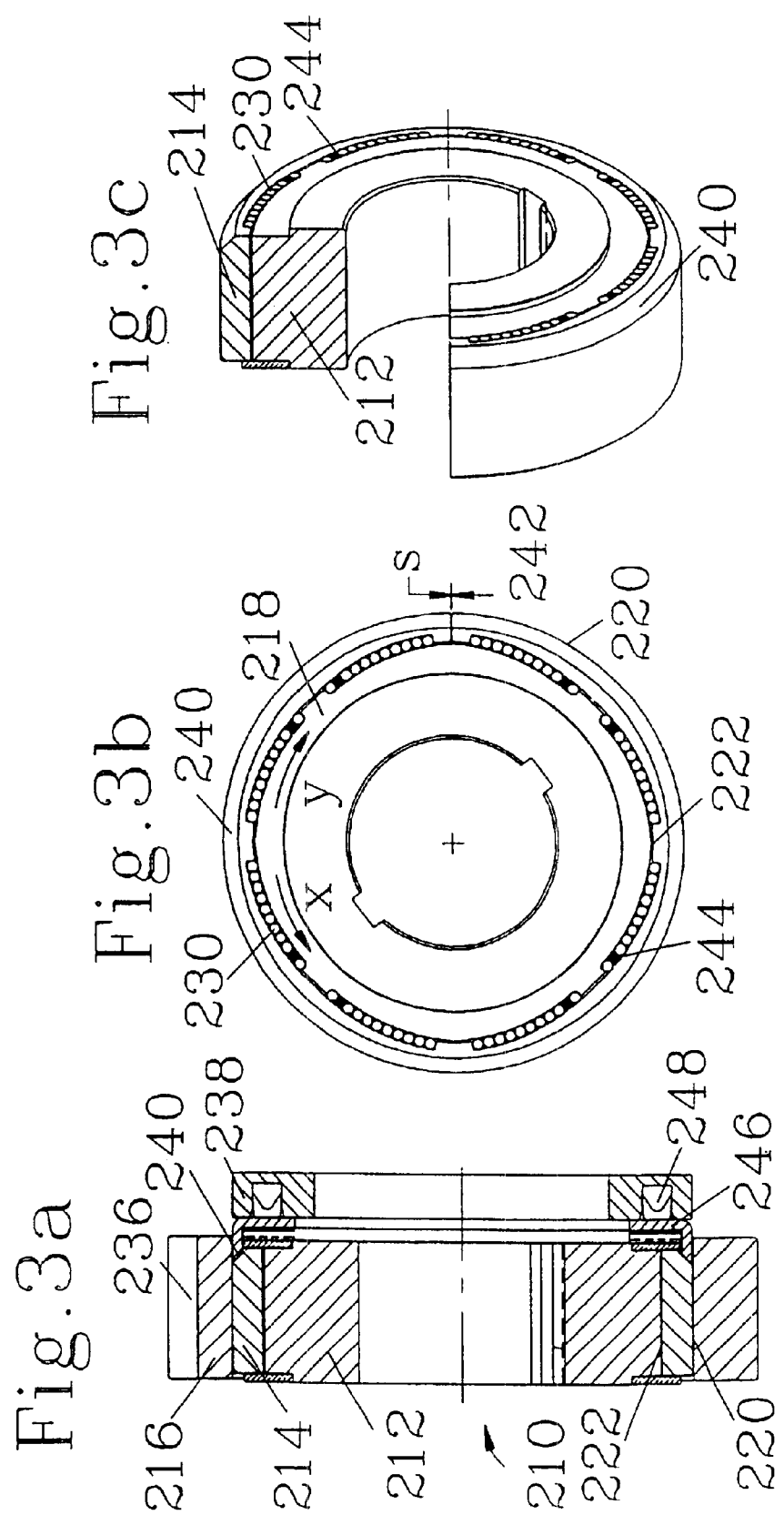

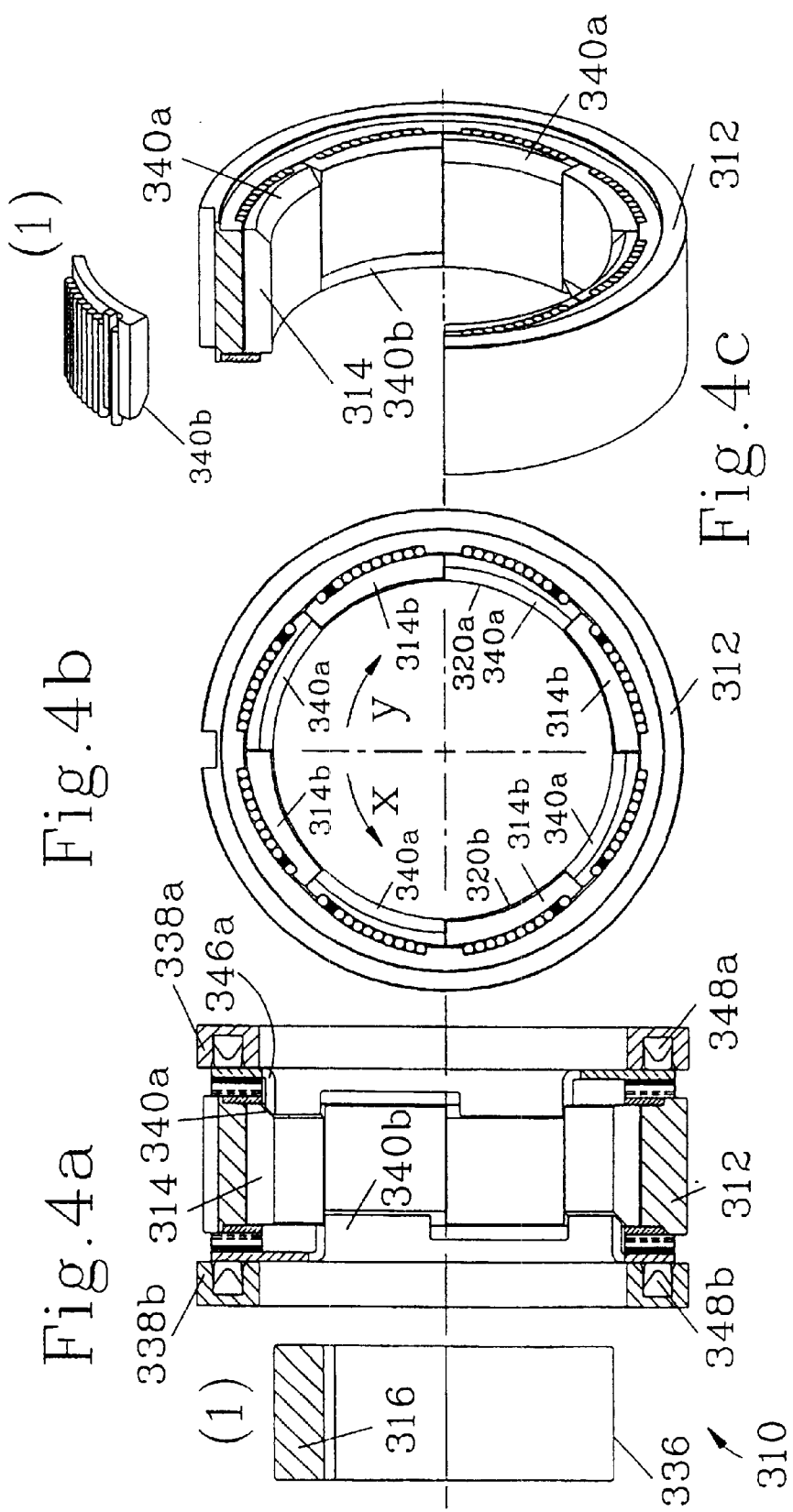

Fig.5a  Fig. 5b
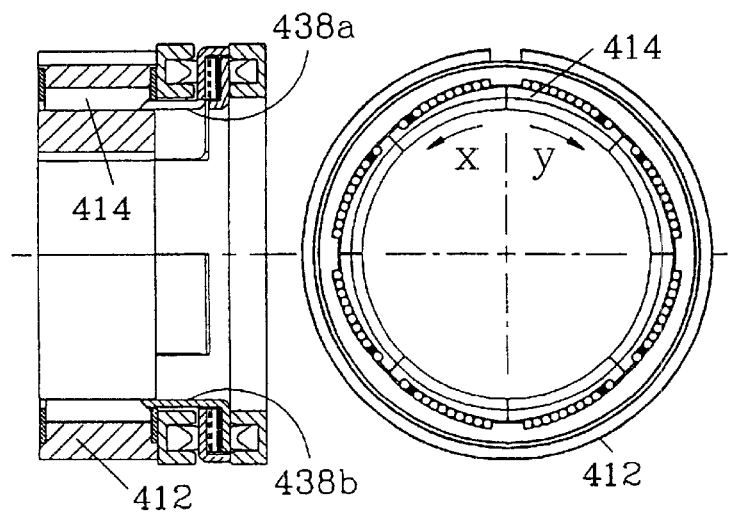
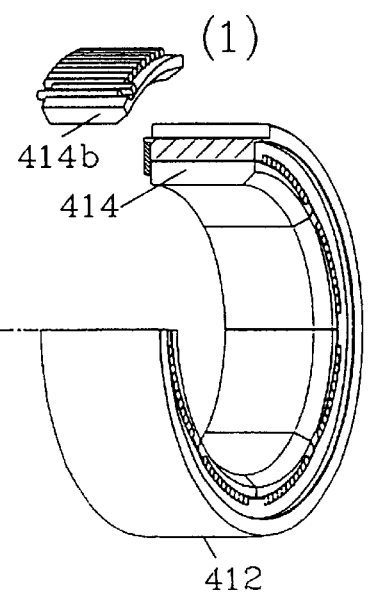
Fig.5c
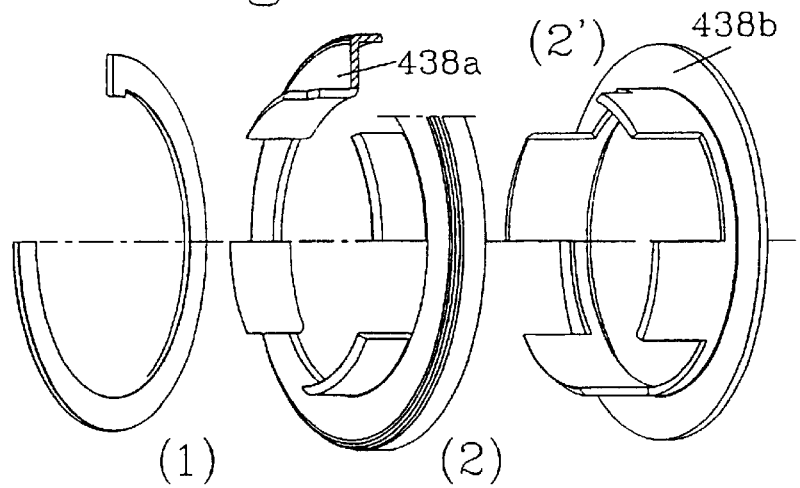

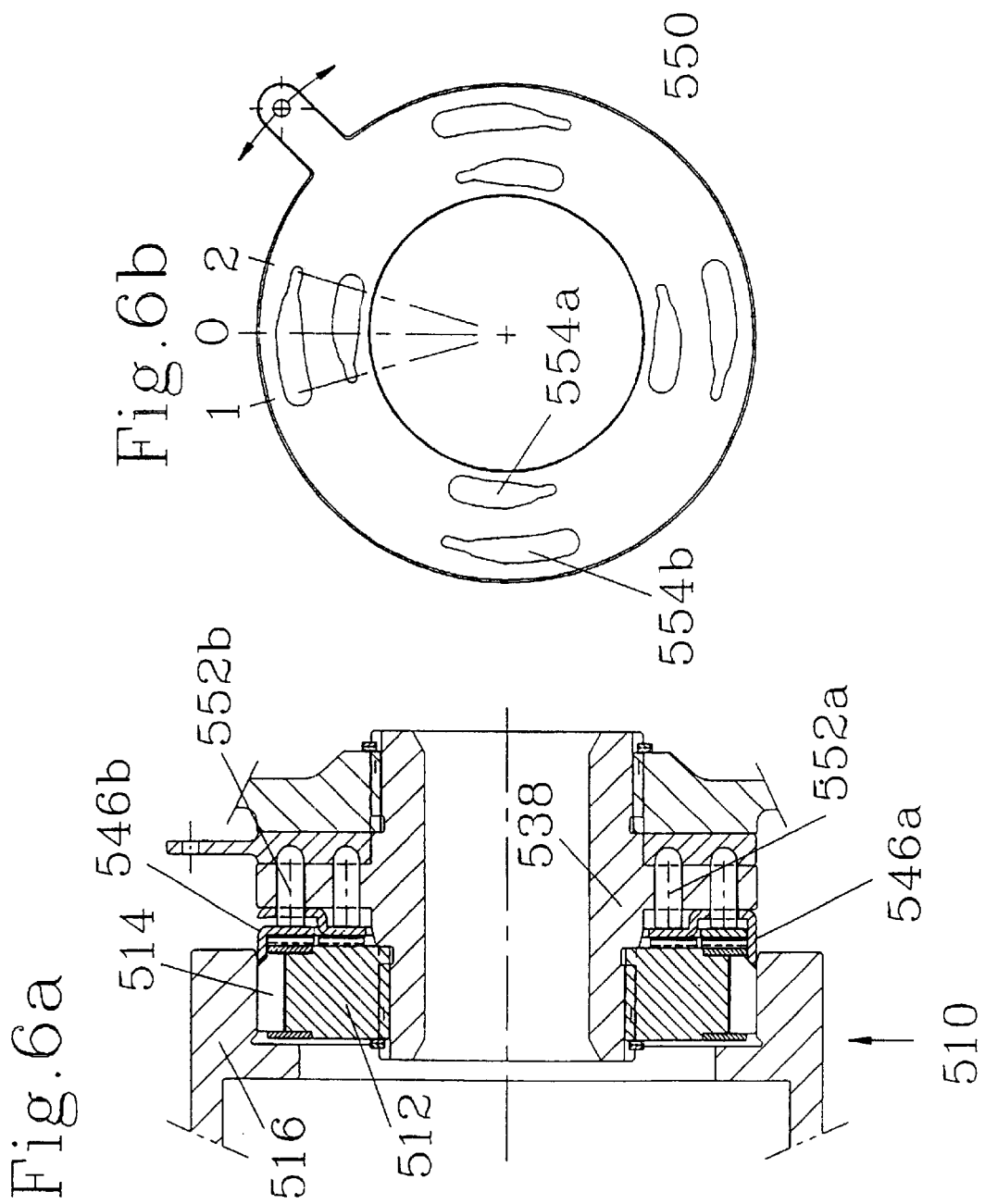

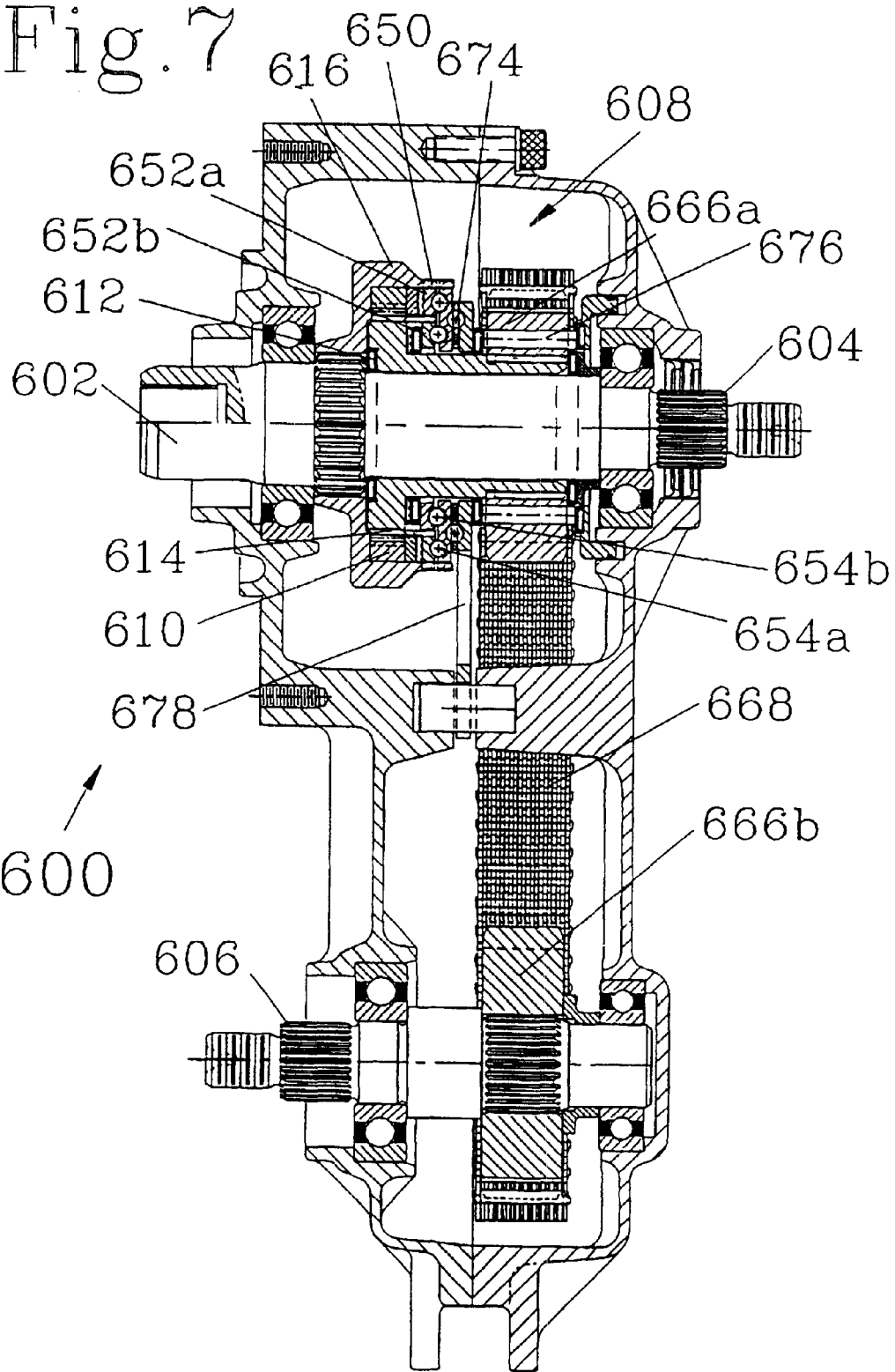

SPIRAL-TYPE COUPLING

This application claims benefit of Ser. No. 60/066,666 filed Nov. 26, 1997.

FIELD OF THE INVENTION

The present invention relates to a coupling for selectively transferring torque from a torque input member to a torque output member. In particular, the present invention relates to a programmable coupling having a plurality of operating modes for selectively transferring torque between a clutch housing and a race.

BACKGROUND OF THE INVENTION

One-way clutches and couplings are widely used in the automotive industry for transferring torque between an input shaft and an output shaft when the input shaft is rotating in one direction relative to the output shaft and for allowing the input shaft to freewheel in the opposite direction. As a result, one-way clutches have been used in torque converters and automatic transmissions to allow an input member to drive an driven member while allowing freewheeling to occur between the input member and the driven member when necessary. Examples of such one-way or overrunning clutches presently in use include sprag clutches and roller-ramp clutches.

The sprag clutch generally comprises an outer race, an inner race, and a plurality of wedge-like elements disposed between the inner and outer race. The geometry of the sprag element is such that it allows the clutch to freewheel in one direction, but becomes wedged between the inner and outer race to lock up the clutch in the opposite direction. The roller-ramp clutch is similar to the sprag clutch but includes a plurality of roller elements in replacement of the sprag elements.

A variant of the conventional roller ramp clutch is taught by Rockwell (U.S. Pat. No. 2,085,606) and includes a plurality of graduated-sized roller elements. Since these devices rely on a wedging action to lock up, the sprag elements, roller elements and races are subjected to extremely high radial stresses during lock up. Further, the sprag and roller elements subject the clutch to vibrations while freewheeling. As a result, such one-way clutches an prone to frequent failure.

Spiral-type one-way clutches have been developed as an improvement over sprag and roller-ramp clutches. State of the art spiral-type one-way clutches, such as that taught by Kerr (EP 0 015 674) comprise an outer member having an inner spiral race, an inner member having an outer spiral race congruent with the inner spiral race, and a plurality of elongate roller bearings disposed between the inner and outer race. The elongate roller bearings reduce the frictional resistance to the differential rotation of the spiral surfaces while providing an even distribution of compression forces on the roller bearings and races. However, as conventional spiral-type one way clutches, and one-way clutches in general, only have a single mode of operation, namely lock up in one direction and freewheeling in the opposite direction, the design of automotive equipment using such clutches is unnecessarily over complicated.

Although Rockwell teaches a two-way roller ramp-type clutch, the graduated-sized roller elements can cause spalling of the roller elements and limit the indexing rate of the clutch. Therefore, it would be desirable to provide a reliable coupling having multiple modes of operation and high indexing rates, but without drastically increasing the cost of the coupling.

SUMMARY OF THE INVENTION

It is an object of the present invention to overcome or reduce the problems associated with the prior art one-way clutches by providing a spiral-type coupling having multiple modes of operation.

The spiral-type coupling, according to the invention, comprises a tubular member including a first tubular surface; a resilient tubular slipper coaxial to the tubular member and including a first tubular friction surface, a second tubular surface opposite the first tubular friction surface which, together with the first tubular surface, defines a channel disposed between the tubular member and the slipper; a plurality of roller elements disposed in the channel for allowing limited rotational movement between the tubular member and the slipper; a race including a second tubular friction surface disposed adjacent the first tubular friction surface; and an actuator for selectively engaging the second tubular friction surface with the first tubular friction surface.

The tubular slipper includes a pair of adjacent end walls extending between the first tubular friction surface and the second tubular surface along the length of the slipper for allowing the diameter of the slipper to vary in accordance with the position of the actuator.

The first tubular surface comprises at least one clockwise-oriented spiral surface and at least one counterclockwise-oriented spiral surface. The second tubular surface is substantially congruent with the first tubular surface. Preferably, the spiral surfaces are involute spiral surfaces so that the first tubular surface and the second tubular surface remain parallel to each other as the slipper is rotated relative to the tubular member.

In one embodiment of the invention, the slipper comprises a plurality of slipper segments, and the actuator comprises a single actuator ring which engages the slipper segments for selecting between a first mode in which the race freewheels in both directions relative to the tubular member, and a second mode in which the race is locked in both directions to the tubular member.

In another embodiment of the invention, the slipper comprises a plurality of slipper segments, and the actuator comprises a pair of actuator rings which engage alternate slipper segments for selecting between a first mode in which the race freewheels in both directions relative to the tubular member, a second mode in which the race is locked in both directions to the tubular member, a third mode in which the race freewheels in the clockwise direction but is locked to the tubular member in the counterclockwise direction, and a fourth mode in which the race freewheels in the counterclockwise direction but is locked to the tubular member in the clockwise direction.

BRIEF DESCRIPTION OF THE DRAWINGS

The invention will now be described, by way of example only, with reference to the drawings, in which like reference numerals indicate like elements, and in which:

FIG. 1a is an axial cross-sectional view of a spiral-type dual-mode coupling according to a first embodiment of the invention, utilizing a full internal slipper and a cone race activator;

FIG. 1b is a transverse cross-sectional view of the spiral-type dual-mode coupling shown in FIG. 1a;

FIG. 2 is a transverse cross-sectional view of one variation of the spiral-type dual-mode coupling shown in FIGS. 1a and 1b, utilizing a segmented internal slipper and cone race activator;

FIG. 3a is an axial cross-sectional view of a second variation of the spiral-type dual-mode coupling shown in FIGS. 1a and 1b, utilizing a full external slipper and ring activator;

FIGS. 3b–3c is a transverse cross-sectional view of the spiral-type dual-mode coupling shown in FIG. 3a;

FIG. 4a is an axial cross-sectional view of a spiral-type quad-mode coupling according to a second embodiment of the invention, utilizing a segmented internal slipper and dual opposed ring activators;

FIG. 4b is a transverse cross-sectional view of the spiral-type quad-mode coupling shown in FIG. 4a;

FIG. 4c is a perspective view of the spiral-type quad-mode coupling shown in FIG. 4a;

FIG. 5a is an axial cross-sectional view of a variation of the spiral-type quad-mode coupling shown in FIG. 4, utilizing a segmented internal slipper and dual coplanar ring activators;

FIG. 5b is a transverse cross-sectional view of the spiral-type quad-mode coupling shown in FIG. 5a;

FIG. 5c is an exploded view of the spiral-type quad-mode coupling shown in FIG. 5a;

FIG. 6a is an axial cross-sectional view of a spiral-type tri-mode coupling according to a third embodiment of the invention, utilizing a cam plate actuator for switching modes;

FIG. 6b is a plan view of the cam plate shown in FIG. 6a;

FIG. 7 is an axial cross-sectional view of a four wheel drive transfer case, utilizing a variation of the cam plate actuator shown in FIG. 6.

DETAILED DESCRIPTION OF THE PREFERRED EMBODIMENT

Figure 8:
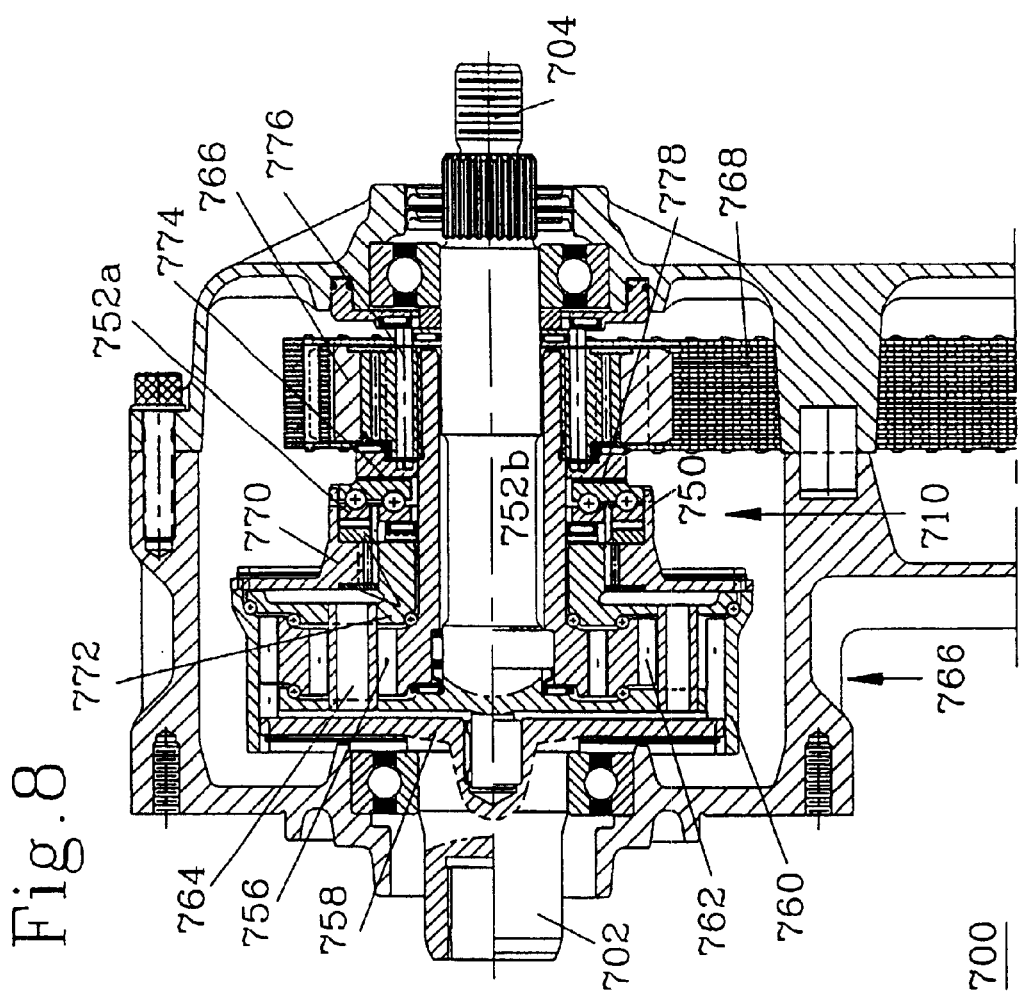
FIG. 8 is an axial cross-sectional view of an all wheel drive transfer case, utilizing a variation of the cam plate actuator shown in FIG. 6.

Turning to FIGS. 1a and 1b, a dual-mode spiral-type coupling, denoted generally as 10, is shown comprising a tubular clutch housing 12, a resilient tubular C-shaped slipper 14 coaxial to and disposed within the clutch housing 12, and a conical race 16 coaxial to and disposed within the slipper 14. The clutch housing 12 has an inner tubular surface 18 which includes a plurality of clockwise outwardly spiraling surface portions 18a, and a plurality of counter-clockwise outwardly spiraling surface portions 18b. As shonw in FIG. 1b, the spiraling surface portions 18a, 18b are disposed around the inner tubular surface 18 in a sequence of alternating clockwise spiraling surface portions 18a and counterclockwise spiraling surface portions 18b. As will be explained, the clockwise spiraling surface portions 18a and the counterclockwise spiraling surface portions 18b serve to selectively restrict rotational movement between the race 16 and the clutch housing 12 in both the clockwise and the counterclockwise directions. Accordingly, it will be appreciated that a sequence of spiraling surface portions 18a, 18b, other than that shown in FIG. 1b, may be adopted without departing from the scope of the invention.

The slipper 14 includes an inner conical friction surface 20, and an outer tubular surface 22. The slipper 14 is provided with a slit defined by a pair of adjacent end walls 24, 26 extending between the inner conical friction surface 20 and the outer tubular surface 22 axially along the length of the slipper 14 for allowing the slipper 14 to expand and contact in response to axial movement of the race 16. The outer tubular surface 22 is substantially congruent with the inner tubular surface 18 and includes a plurality of clockwise outwardly spiraling surface portions 22a, and a plurality of counterclockwise outwardly spiraling surface portions 22b. Preferably, the spiraling surface portions 18a, 18b, 22a, 22b are involute spirals so that as the slipper 14 rotates relative to the clutch housing 12, the inner tubular surface 18 remains parallel to the outer tubular surface 22. However, other spiral shapes may be adopted as the application demands.

The inner tubular surface 18 and the outer tubular surface 22 together define a counterclockwise-oriented and clockwise oriented channels 28 disposed between he clutch housing 12 sad the slipper 14 extending the length of the clutch housing 12 and the slipper 14. A plurality of elongated roller bearings 30 are disposed within the channel 28 to provide restricted rotational movement between the slipper 14 and the clutch housing 12 in a manner to be described below. The clutch housing 12 is provided with a plurality of flanges 32 extending radially inwards from the inner tubular surface 18, and the slipper 14 is provided with a plurality of flanges 34 extending radially outwards from the outer tubular surface 22 for restricting radial movement of the roller bearings 30 along the channels 28 by separating the clockwise-oriented channels from the counterclockwise-oriented channels 28 and for reducing the locking and unlocking times of the coupling 10. However, it will be appreciated that in applications where rapid locking and unlocking times are not critical, the flanges 32, 34 may be eliminated.

The conical race 16 includes an outer conical friction surface 36 congruent with the inner conical friction surface 20. An actuator, not shown, is provided for moving the conical race 16 towards and away from the slipper 14 along a line coaxial to the centre of rotation of the slipper 14.

The two modes of operation of the coupling 10 will now be described. When the actuator is inactive and the conical race 16 is in the position shown in FIG. 1a, the functional forces between the slipper 14 and the race 16 are sufficiently small such that the race 16 can be driven in either the clockwise direction or the counterclockwise direction. Therefore, in this position the coupling 10 is in the bi-directional freewheeling mode with the race 16 free to rotate in both directions.

When the actuator is active, the conical race 16 is driven towards the slipper 14 such that the outer conical fictional surface 36 engages the inner conical friction surface 20. Due to the resilient nature of the slipper 14 and the slit defined by the end walls 24, 26, the slipper 14 expands radially in response to the axial movement of the race 16, thereby increasing the radial force exerted by the slipper 14 against the race 16. If the race 16 is driven sufficiently deeply into the slipper 14 and then subsequently rotated in the clockwise direction, the clockwise outwardly spiraling surface portions 22a will rotate towards the clockwise outwardly spiraling surface portions 18a causing the width of the channel 28 between the spiral surface portions 18a, 22a to narrow and the inner conical friction surface 20 to be held with greater force against the outer conical friction surface 36. As the race 16 continues to rotate clockwise, the channel 28 will continue to narrow until the slipper 14 and the race 16 become locked to the clutch housing 12. At this point, the input torque from the race 16 is coupled to the clutch housing 12 causing the clutch housing 12 to rotate clockwise with the race 16. Alternately, if input torque is applied to the clutch housing 12 rather than to the race 16, and in the counterclockwise direction, the input torque from the clutch housing 12 would be coupled to the race 16 causing the race 16 to rotate counterclockwise with the clutch housing 12.

If the direction of rotation of the race 16 is reversed, the width of the channel 28 will initially increase, and then subsequently decrease as the counterclockwise outwardly spiraling surface portions 22b are driven towards the counterclockwise outwardly spiraling surface portions 18b. As above, as the race 16 continues to rotate counterclockwise, the channel 28 will continue to narrow until the slipper 14 and the race 16 become locked to the clutch housing 12. At this point, the input torque from the race 16 is coupled to the clutch housing 12 causing the clutch housing 12 to rotate counterclockwise with the race 16. Accordingly in this mode, the coupling 10 is in the bi-directional full coupling mode with the race 16 coupled to the clutch housing 12 in both directions.

Turning now to FIG. 2, a dual-mode spiral-type coupling 110 is shown substantially identical to the spiral-type coupling 10 but with the C-shaped slipper 14 replaced with a segmented slipper 114. As shown therein, the slipper 114 comprises a plurality of slipper segments 114a, 114b interlocked through tongue and groove means. The slipper segments 114a include clockwise outwardly spiraling surface portions 122a, while the slipper segments 114b include counterclockwise outwardly spiraling surface portions 122b. As above, the inner tubular surface 18 of the clutch housing 12 includes a plurality of clockwise outwardly spiraling surface portions 18a, and a plurality of counterclockwise outwardly spiraling surface portions 18b, with the spiraling surface portions 122a, 122b being substantially congruent to the spiraling surface portions 18a, 18b. As shown in FIG. 2, the spiraling surface portions 122a, 122b are disposed around the inner tubular surface 18 in a sequence of alternating clockwise spiraling surface portions 122a and counterclockwise surface portions 22b. However, as discussed above, some other sequence of spiraling surface portions 122a, 112b may be adopted.

FIGS. 3a, 3b and 3c show a variation of the dual-mode spiral-type coupling 10. The spiral-type coupling 210 shown therein comprises a tubular clutch housing 212, a resilient tubular C-shaped slipper 214 coaxial to and disposed externally to the clutch housing 212, a cylindrical race 216 coaxial to and disposed externally to the slipper 214, and an actuator 235 coupled to the slipper 214. The clutch housing 212 has an outer tubular surface 218 which includes a plurality of clockwise outwardly spiraling surface portions, and a plurality of counterclockwise outwardly spiraling surface portions.

The slipper 214 includes an outer cylindrical friction surface 220, and an inner tubular surface 222. The slipper 214 is provided with a chamfered edge 240, and a slit 242 extending between the outer cylindrical friction surface 220 and the inner tubular surface 222 axially along the length of the slipper 214. The inner tubular surface 222 is substantially congruent with the outer tubular surface 218 and includes a plurality of clockwise outwardly spiral surface portions, and a plurality of counterclockwise outwardly spiraling surface portions. The cylindrical race 216 includes an inner cyclical fiction surface 236 congruent with the outer cylindrical friction surface 220.

The outer tubular surface 218 and the inner tubular surface 222 together define a channel disposed between the clutch housing 212 and the slipper 214 for receiving a plurality of roller bearings 230 and resilient elements 244 within the channel. As will be appreciated, the resilient element 244 serve to soften the locking and unlocking action of the coupling 218 by maintaining parallel alignment of the roller bearings.

The actuator 238 comprises an actuator ring 246 for engaging the chamfered edge 240, and a piston 248 coupled to the actuator ring 246 for axially moving the actuator ring 246 towards and away from the slipper 214.

The two modes of operation of the coupling 210 will now be described. When the piston 248 is inactive, the inner friction surface 236 of the race 216 engages the outer frictional surface 220 of the slipper 214. As a result, clockwise and counterclockwise rotation of the race 216 causes the channel to narrow, as described above, until the race 216 becomes locked to the clutch housing 212. When the piston 248 is active, the actuator ring 246 engages the chamfered edge 240, causing the slipper 214 to move radially inwards away from the race 216. As a result, the race 216 becomes free to rotate in either direction about the clutch housing 212.

Turning now to FIGS. 4a, 4b and 4c, a preferred quad-mode spiral-type coupling 310 is shown comprising a tubular outer clutch housing 312, a segmented inner slipper 314 coaxial to and disposed within the clutch housing 312, a cylindrical race 316 coaxial to and disposed within the slipper 314, and a pair of first and second actuators 338a, 338b coupled to opposite side edges of the slipper 314. The slipper 314 comprises a plurality of slipper segments 314a, 314b. Each slipper segment 314a includes a chamfered edge 340a, an inner frictional surface 320a and a clockwise spiraling surface portion, while each slipper segment 314b includes a chamfered edge 340b, an inner frictional surface 320b and counterclockwise spiraling surface portion. As shown in FIG. 4b, the slipper segments 314a, 314b are disposed around the inner tubular surface 318 of the clutch housing 312 in a sequence of alternating clockwise slipper segments 314a and counterclockwise slipper segments 314b. In addition, the chamfered edges 340a are all disposed on one side of the coupling 310, while the chamfered edges 340b are all disposed on the opposite side of the coupling 310.

The first actuator 338a comprises a first actuator ring 346a for engaging the chamfered edges 340a, and a first piston 348a coupled to the first actuator ring 346a for axially moving the first actuator ring 346a towards and away from the slipper 314. Similarly, the second actuator 338b comprises a second actuator ring 346b for engaging the chamfered edges 340b, and a second piston 348b coupled to the second actuator ring 346b for axially moving the second actuator ring 346b towards and away from the slipper 314.

The four modes of operation of the coupling 310 will now be described. When the first and second pistons 348a, 348b are both inactive, the outer friction surface 336 of the race 316 engages the inner frictional surface 320a of the clockwise slipper segments 314a and the inner frictional surface 320b of the counterclockwise slipper segments 314b. As a result, the race 316 becomes locked to the clutch housing 312. When the first piston 348a is active but the second piston 348b inactive, the race 316 becomes freed from the clockwise slipper segments 314a but remains coupled to the counterclockwise slipper segments 314b. As a result, the race 316 is free to rotate in the clockwise direction only. When the first piston 348a is inactive but the second piston 348b active, the race 316 becomes freed from the counterclockwise slipper segments 314b but remains coupled to the clockwise slipper segments 314a. As a result, the race 316 is free to rotate in the counterclockwise direction only. When the first and second pistons 348a, 348b are both active, the race 316 becomes freed from the clockwise slipper segments 314a and the counterclockwise slipper segments 314b. As a result, the race 316 is free to rotate about the clutch housing 312 in both the clockwise direction and in the counterclockwise direction.

FIGS. 5a, 5b and 5c show a quad-mode spiral-type coupling 410 substantially similar to the quad-mode spiral-type coupling 310 except that the slipper segments 414a, 414b are all chamfered on a common edge, and the first and second ring actuators 438a, 438b are both disposed on the same side edge of the slipper 414. The first actuator 438a is coupled to the clutch housing 412 and rotates therewith to maintain alignment with the slipper segments 414a, and the second actuator 438b is coupled to the clutch housing 412 and rotates therewith to maintain alignment with the slipper segments 414b.

Turning to FIGS. 6a, 6b, 6c, a tri-mode spiral-type coupling 510 is shown similar to the quad-mode spiral-type coupling 410, but replacing the segmented inner slipper 414 with a chamfered segmented outer slipper 514 and including a single novel cam actuator 538 assembly in replacement of the pistons of the first and second ring actuators 438a, 438b. The cam actuator 538 comprises a cam plate 550 rotatably coupled to the clutch housing 512, a first cam follower 552a coupled between the cam plate 550 and the first actuator ring 546a, and a second cam follower 552b coupled between the cam plate 550 and the second actuator ring 546b. The cam actuator is provided with a plurality of first cam slots 554a for engaging the first cam follower 552a, and a plurality of second cam slots 554b for engaging the second cam follower 552b.

The three modes of operation of the coupling 510 will now be described. When the cam plate 550 is oriented in the position denoted by reference numeral 1 in FIG. 6b, the first cam follower 552a engages the first actuator ring 546a, causing the race 516 to be freed from the clockwise slipper segments 514a but to remain coupled to the counterclockwise slipper segments 514b. As a result, the race 516 is allowed to rotate in the clockwise direction only. When the cam plate 550 is oriented in the position denoted by reference numeral 2 in FIG. 6b, the second cam follower 552b engages the second actuator ring 546b, causing the race 516 to be freed from the counterclockwise slipper segments 514b but to remain coupled to the clockwise slipper segments 514a. As a result, the race 516 is allowed to rotate in the counterclockwise direction only. When the cam plate 550 is oriented in the position denoted by reference numeral 0 in FIG. 6b, neither of the first or second cam followers 552a, 552b engage the actuator rings 546, thereby causing the race 516 to remain coupled to the clockwise slipper segments 514a and the counterclockwise slipper segments 514b. As a result, the race 516 remains coupled to the clutch housing 512 in both directions. Other modes of operation can be made available by varying the relative shapes of the first and second cam slots 554a, 554b.

Turning now to FIG. 7, a four-wheel drive transfer case 600 is shown which embodies the inventive programmable couplings described above. The transfer case 600 comprises an input shaft 602, a rear wheel output shaft 604, a front wheel output shaft 606, and a torque transfer assembly 608 for transferring torque from the input shaft 602 to the front wheel output shaft 606 while allowing overrunning of the front wheel output shaft 606 independently of the direction of rotation of the input shaft 602. The torque transfer assembly 608 comprises an input disc 616 splined to the input shaft 602, a spiral-type two-way coupling 610 coupled to the input shaft 602, a first front wheel drive sprocket 666a coupled to the two-way coupling 610, a second front wheel drive sprocket 666b splined to the front wheel output shaft 606, and a chain 668 trained around the front wheel drive sprockets 666a, 666b.

The coupling 610 is similar to the tri-mode spiral-type coupling 510, and comprises a clutch body 612, and a slipper 614, with the input disc 616 acting as the race. The coupling 610 also includes a rotatable cam plate 650 coupled to the front wheel drive sprocket 666a through a friction plate 674, a first cam follower 652a coupled between the cam plate 650 and the clockwise slipper segments, and a second cam follower 652b coupled between the cam plate 650 and the counterclockwise slipper segments. The cam plate 650 is provided with a plurality of ball cams 654a, 654b for engaging the first and second cam followers 652a, 652b. However, unlike the coupling 510, the cam plate 650 only provides two modes of operation: clockwise freewheeling and counterclockwise freewheeling.

The transfer case 600 also includes an actuator 676 coupled to the cam plate 650 through an axially-movable yoke 678 for enabling or disabling four-wheel drive mode.

In operation, with the vehicle moving in a straight line, torque from the input shaft 602 is applied to the rear wheel output shaft 604, and to the front wheel output shaft 606 through the coupling 610. When the vehicle turns and the front wheels rotate faster than the rear wheels, the coupling 610 allows the slipper 612 to overrun the input disc 616 to allow the vehicle turn to be completed without rear wheel slippage.

Turning now to FIG. 8, an all-wheel drive transfer case 700 is shown which embodies the inventive programmable couplings described above. The transfer case 700 comprises an input shaft 702, a rear wheel output shaft 704, a front wheel output shaft (not shown), and a coplanar reverted gear train loop 706 coupled between the input shaft 702, the rear wheel output shaft 704 and the front wheel output shaft for splitting input torque between the rear wheel output shaft 704 and the front wheel output shaft. A spiral-type two-way coupling 710 is coupled between the input shaft 702 and the rear wheel output shaft 704 for allowing overrunning of the front wheel output shaft independently of the direction of rotation of the input shaft 702.

The coplanar reverted gear train loop 706 comprises an externally-toothed pinion 756, an eccentric cage 758 disposed around the pinion 756, and an internally-toothed annular gear 760 disposed around the cage 758 and being coplanar to the pinion 756 and the cage 758. The eccentric cage 758 comprises a ring gear 762 and an eccentric guide 764 for providing the ring gear 762 with an axis of rotation eccentric to that of the pinion 756 and the annular gear 760. The ring gear 762 has an external set of teeth which mesh with the internally-toothed annular gear 760, and an internal set of teeth which mesh with the externally-toothed pinion 756. The cage 758 is coupled to the rear wheel output shaft 704, and the annular gear 760 is coupled to the input shaft 702.

A first front wheel drive sprocket 766 is splined to the pinion 756, and a second front wheel drive sprocket (not shown) is splined to the front wheel output shaft. A chain is trained around the first front wheel drive sprocket 766 and the second front wheel drive sprocket for coupling the pinion 756 to the front wheel output shaft.

The spiral-type two-way coupling 710 is coupled to the extension 770 of the annular gear 760 and the extension 772 of the cage 758. The coupling 710 is substantially identical to the dual-mode spiral-type coupling 610, and comprises a rotatable cam plate 750 coupled to the front wheel drive sprocket 766 through a friction plate 774, a first cam follower 752a coupled between the cam plate 750 and the clockwise slipper segments, and a second cam follower 752b coupled between the cam plate 750 and the counterclockwise slipper segments. The transfer case 700 also includes an actuator 776 coupled to the cam plate 750 through an axially-movable yoke 778 for enabling or disabling all-wheel drive mode.

In operation, the coplanar reverted gear train loop 706 unequally splits the input torque from the input shaft 702 between the pinion 756 and the cage 758 in accordance with the ratio of the number of teeth on the pinion 756, the ring gear 762 and the annular gear 760. As a result, one of the output shafts is driven more actively than the other. However, the relative sizes of the first front wheel drive sprocket 766 and the second front wheel drive sprocket are such that the less actively driven output shaft is rotated more slowly than the other output shaft to allow the less actively driven output shaft to overrun up to a predetermined threshold.

In one implementation of the invention, the coplanar reverted gear train loop 706 directs 60% of the input torque to the rear wheel output shaft 704 and the remainder to the front wheel output shaft. However, the relative sizes of the first front wheel drive sprocket 766 and the second front wheel drive sprocket are such that the front wheel output shaft is rotated by the coplanar reverted gear train loop 706 about 15–20% slower than the rear wheel output shaft 704. Accordingly, when the vehicle enters a turn, or the front freewheels lose traction, the front wheels will be allowed to rotate up to 15–20% faster than the rear wheels with the relative proportions of torque remaining the same. If the front wheels attempt to rotate at a greater relative rate, the coupling 710 will couple the annular gear 760 to the cage 758, thereby causing the coplanar reverted gear train loop 706 to rotate as a solid coupling and the differential rate of rotation to be limited to the 15–20% factor described above.

If vehicle direction is reversed, the rotatable cam plate 750 coupled to the front wheel drive sprocket 766 will select the opposite freewheeling mode of the coupling 710 to again allow the front wheels to rotate at up to 15–20% faster than the rear wheels before the coplanar reverted gear train loop 706 locks up.

The foregoing description of the preferred embodiment is intended to be illustrative of the present invention. Those of ordinary skill will be able to envisage certain additions, deletions and/or modifications to the described embodiments which, although not explicitly disclosed herein, are encompassed by the scope of the invention, as defined by the appended claims.

I claim:

1. A spiral-type coupling comprising:
    a first coupling member including a first bearing surface, the first bearing surface comprising at least one first clockwise-oriented spiral surface and at least one first counterclockwise-oriented spiral surface;
    a second coupling member including a first friction surface;
    a resilient tubular slipper disposed between the first and second coupling members, the slipper including a second friction surface for engaging with the first friction surface, a second bearing surface coaxial to the first bearing surface, and a slit extending between the second friction surface and the second bearing surface along a length of the slipper, the second bearing surface comprising a second clockwise-oriented spiral surface congruent with the at least one first clockwise-oriented spiral surface and a second counterclockwise-oriented spiral surface congruent with the at least one first counterclockwise-oriented spiral surface, the first clockwise-oriented spiral surfaces together with the associated second clockwise-oriented spiral surfaces defining respective clockwise-oriented channels therebetween, the first counterclockwise-oriented spiral surfaces together with the associated second counterclockwise-oriented spiral surfaces defining respective counterclockwise-oriented channels therebetween, the clockwise-oriented channels being separate from the counterclockwise-oriented channels; and the spiral surfaces comprising involute spiral surfaces;
    roller elements disposed in the channels for coupling the first coupling member to the second coupling member as the slipper and the first coupling member rotate relative to one another;
    a resilient element disposed in at least one of the channels for maintaining parallel alignment of the roller elements; and
    an actuator for axially moving the tubular slipper for controlling the coupling of the first coupling member to the second coupling member.

2. The spiral-type coupling according to claim 1, wherein the slipper is chamfered on an edge thereof, and the actuator comprises an actuator ring aligned with the chamfered edge and a piston coupled to the actuator ring for axially engaging the chamfered edge.

3. The spiral-type coupling according to claim 1, wherein the slipper comprises a plurality of slipper segments, the second bearing surface of a first portion of the slipper segments comprising the second clockwise-oriented spiral surface, and the second bearing surface of a second portion of the slipper segments comprising the second counterclockwise-oriented spiral surface, and the coupling includes an actuator for radially moving the slipper segments for controlling the coupling of the first coupling member to the second coupling member.

4. The spiral-type coupling according to claim 3, wherein each said slipper segment is chamfered on an edge thereof, and the actuator comprised an actuator ring aligned with the chamfered edges and a piston coupled to the actuator ring for axially engaging the chamfered edges.

5. The spiral-type coupling according to claim 3, wherein each said slipper segment is chamfered on an edge thereof, and the actuator comprises a first actuator ring aligned with the first portion chamfered edges and a first piston coupled to the first actuator ring for axially engaging the first chamfered edges, and a second actuator ring aligned with the second portion chamfered edges and a second piston coupled to the second actuator ring for axially engaging the second portion chamfered edges.

6. The spiral-type coupling according to claim 5, wherein the chamfered edges are disposed on a common side of the coupling.

7. The spiral-type coupling according to claim 5, wherein the first portion chamfered edges are disposed on one side of the coupling, and the second portion chamfered edges are disposed on an opposite side of the coupling.

8. The spiral-type coupling according to claim 3, wherein each said slipper segment is chamfered on an edge thereof with the chamfered edges being disposed on a common side of the coupling, and the actuator comprises a first actuator ring aligned with the first portion chamfered edges, and a second actuator ring aligned with the second portion chamfered edges, and a rotatable cam plate coupled to the actuator rings for selectively axially moving the actuator rings.

9. A spiral-type coupling comprising:
    a first coupling member including a first bearing surface, the first bearing surface comprising at least one first clockwise-oriented spiral surface and at least one first counterclockwise-oriented spiral surface;
    a second coupling member including a first friction surface;

a tubular slipper disposed between the first and second coupling members, the slipper including a second friction surface for engaging with the first friction surface, and a second bearing comprising a plurality of slipper segments chamfered on a respective edge thereof, the second bearing surface of a first portion of the slipper segments being coaxial to and congruent with the clockwise-oriented spiral surface, and the second bearing surface of a second portion of the slipper segments being coaxial to and congruent with the counterclockwise-oriented spiral surface, the first clockwise-oriented spiral surfaces together with the associated second clockwise-oriented spiral surfaces defining respected clockwise-oriented channels therebetween, the first counterclockwise-oriented spiral surfaces together with the associated second counterclockwise-oriented spiral surfaces defining respected counterclockwise-oriented channels therebetween;

roller elements disposed in the channels for coupling the first coupling member to the second coupling member as the slipper and the first coupling member rotate relative to one another; and an actuator coupled to the chamfered edges for selectively engaging the second friction surface with the first friction surface.

10. The spiral-type coupling according to claim 9, wherein the chamfered edges are disposed on a common side of the coupling, and the actuator comprises an actuator ring aligned with the chamfered edges and a piston coupled to the actuator ring for axially moving the actuator ring.

11. The spiral-type coupling according to claim 9, wherein the chamfered edges are disposed on a common side of the coupling, and the actuator comprises a first actuator ring aligned with the first portion chamfered edges, a second actuator ring aligned with the second portion chamfered edges, and a rotatable cam plate coupled to the actuator rings for selectively axially moving the actuator rings.

12. The spiral-type coupling according to claim 9, wherein the cam plate is configured for providing three coupling modes, the cam plate providing a first of the coupling modes by only axially moving the second actuator ring, the cam plate providing a third of the coupling modes by only axially moing the second actuator ring, cam plate providing a third of the coupling modes by commonly axially positioning the first and second actuator rings.

13. A spiral-type four-way coupling comprising:

a first coupling member including a first bearing surface, the first bearing surface comprising at least one clockwise-oriented spiral surface and at least one first counterclockwise-oriented spiral surface;

a second coupling member including a first friction surface;

a tubular slipper disposed between the first and second coupling members, the slipper including a second friction surface for engaging with the first friction surface, and a second bearing comprising a plurality of slipper segments chamfered on a respective edge thereof, the second bearing surface of a first portion of the slipper segments being coaxial to and congruent with the clockwise-oriented spiral surface, and the second bearing surface of a second portion of the slipper segments being coaxial to and congruent with the counterclockwise-oriented spiral surface, the first clockwise-oriented spiral surfaces together with the associated second clockwise-oriented spiral surfaces defining respected clockwise-oriented channels therebetween, the first counterclockwise-oriented spiral surfaces together with the associated second counterclockwise-oriented spiral surfaces defining respective counterclockwise-oriented channels therebetween;

roller elements disposed in the channels for coupling the first coupling member to the second coupling member as the slipper and the first coupling member rotate relative to one another; a first actuator ring aligned with the chamfered edges of the first portion for controlling engagement of the second friction surface of the first portion with the first friction surface for selectively allowing clockwise rotation between the coupling members; and a second actuator ring aligned with the chamfered edges of the second portion for controlling engagement of the second friction surface of the second portion with the first friction surface for selectively allowing counterclockwise rotation between the coupling members.

14. A spiral-type four-way coupling according to claim 13, wherein the first portion chamfered edges and the second portion chamfered edges are disposed on a common side of the coupling.

15. A spiral-type four-way coupling according to claim 13, wherein the first portion chamfered edges are disposed on one side of the coupling, and the second portion chamfered edges are disposed on an opposite side of the coupling.

16. A four-wheel drive transfer case comprising:

a torque input member;

a rear wheel torque output member coupled to the torque input member;

a front wheel torque output member;

a torque transfer assembly for transferring torque from the torque input member to the front wheel torque output member, the torque transfer assembly comprising a spiral-type two-way coupling according to any of claims 9 to 11, the two-way coupling being coupled between the torque input member and the front wheel torque output member, with the actuator being coupled to the torque input member for allowing overrunning of the front wheel torque output member independently of a direction of rotation of the torque input member.

17. An all-wheel drive transfer case comprising:

a torque input member;

a rear wheel torque output member;

a front wheel torque output member;

a reverted gear train loop coupled to the torque input for splitting input torque between the rear wheel torque output member and the front wheel torque output member, one of the torque output members being driven less actively the other torque output member; and a spiral-type two-way coupling according to any of claims 9 to 11, the two-way coupling being coupled between the torque input member and one of the torque output members, with the actuator being coupled to the torque input member for limiting overrunning of the less actively driven torque output member independently of a direction of rotation of the torque input member.

* * * * *

UNITED STATES PATENT AND TRADEMARK OFFICE
CERTIFICATE OF CORRECTION

PATENT NO. : 6,446,776 B1
DATED : September 10, 2002
INVENTOR(S) : Kerr

It is certified that error appears in the above-identified patent and that said Letters Patent is hereby corrected as shown below:

<u>Column 1,</u>
Line 22, delete "an" and insert -- a -- therefor;
Line 43, delete "an" and insert -- are -- therefor;

<u>Column 3,</u>
Line 48, delete "shonw" and insert -- shown -- therefor;

<u>Column 4,</u>
Line 15, delete "are" and insert -- is -- therefor;

<u>Column 5,</u>
Line 32, delete "22b" and insert -- 122b -- therefor;
Line 41, delete "235" and insert -- 238 -- therefor;
Line 56, delete "fiction" and insert -- friction -- therefor;
Line 63, delete "serve" and insert -- serves -- therefor;

<u>Column 10,</u>
Line 42, insert -- portion -- after "first" to read -- first portion chamfered edges --;
Line 57, delete "and";

<u>Column 11,</u>
Line 44, delete "third" and insert -- second -- therefor; and
Line 45, insert -- the -- before "cam plate".

Signed and Sealed this

Eleventh Day of February, 2003

JAMES E. ROGAN
*Director of the United States Patent and Trademark Office*